(12) United States Patent
Chiba (10) Patent No.: US 10,165,144 B2
(45) Date of Patent: Dec. 25, 2018

(54) IMAGE FORMING APPARATUS, CONTROL METHOD THEREFOR, AND STORAGE MEDIUM

(71) Applicant: CANON KABUSHIKI KAISHA, Tokyo (JP)

(72) Inventor: Shinichi Chiba, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/677,466

(22) Filed: Aug. 15, 2017

(65) Prior Publication Data

US 2017/0346979 A1   Nov. 30, 2017

Related U.S. Application Data

(63) Continuation of application No. 15/151,515, filed on May 11, 2016, now Pat. No. 9,774,753.

(30) Foreign Application Priority Data

May 28, 2015 (JP) .................................. 2015-109122
Feb. 22, 2016 (JP) .................................. 2016-031463

(51) Int. Cl.
*H04N 1/04* (2006.01)
*H04N 1/00* (2006.01)
*G06K 15/00* (2006.01)

(52) U.S. Cl.
CPC ..... *H04N 1/00891* (2013.01); *G06K 15/4055* (2013.01)

(58) Field of Classification Search
CPC .... G06F 1/3296; G06F 1/3203; G06F 1/3287; G06F 1/3206; G06F 1/329; G06F 3/0416;
(Continued)

(56) References Cited

U.S. PATENT DOCUMENTS 7,474,431 B2 * 1/2009 Yamano ................ G06F 1/3203
358/1.15
8,078,892 B2 * 12/2011 Satoh ...................... H04L 12/10
713/320
(Continued)

FOREIGN PATENT DOCUMENTS

| CN | 102033451 A | 4/2011 |
|---|---|---|
| CN | 103780785 A | 5/2014 |
| JP | 2009-302831 A | 12/2009 |

OTHER PUBLICATIONS

Chinese Office Action issued in corresponding Chinese Application No. 201610338423.3 dated Jul. 31, 2018.

*Primary Examiner* — Negussie Worku
(74) *Attorney, Agent, or Firm* — Venable LLP (57) ABSTRACT

There is provided a technique of appropriately shifting an image forming apparatus to a power saving state in consideration of the use status of an external device such as a connected USB device. When a condition for shifting to a sleep state is satisfied, the CPU of the image forming apparatus determines whether or not a setting of a sleep shift at the time of use of the USB device is "permit". If it is determined that the setting of the sleep shift at the time of use of the USB device is "do not permit", the CPU determines whether or not the connected USB device is in use. If it is determined that the USB device is not in use, the CPU shifts the image forming apparatus to the sleep state.

33 Claims, 4 Drawing Sheets

(58) Field of Classification Search
CPC .... G06F 3/1229; G06F 1/3253; G06F 1/3278;
G06F 1/3293; G06F 3/038; H04N
2201/0094; H04N 1/00891; H04N 5/2256
USPC .................................... 358/1.14, 1.13, 1.9
See application file for complete search history.

(56) References Cited

U.S. PATENT DOCUMENTS

| | | | |
|---|---|---|---|
| 9,285,866 B2 | 3/2016 | Iguchi | |
| 9,338,320 B2 | 5/2016 | Haga et al. | |
| 9,360,912 B2 | 6/2016 | Takatani | |
| 9,405,252 B2 | 8/2016 | Park | |
| 9,432,545 B2* | 8/2016 | Hirouchi | G06F 3/1236 |
| 9,600,219 B2* | 3/2017 | Miyata | G06F 3/1278 |
| 9,774,753 B2* | 9/2017 | Chiba | G06K 15/4055 |
| 9,785,224 B2* | 10/2017 | Yamashita | G06F 9/4418 |
| 9,880,766 B2* | 1/2018 | Hashimoto | G06F 3/061 |
| 9,924,058 B2* | 3/2018 | Goda | H04N 1/00891 |
| 9,930,210 B2* | 3/2018 | Hanano | H04N 1/33376 |
| 2005/0007628 A1* | 1/2005 | Yamano | G06F 1/3203 |
| | | | 358/1.15 |
| 2005/0128515 A1* | 6/2005 | Ohno | H04N 1/00204 |
| | | | 358/1.15 |
| 2009/0313493 A1 | 12/2009 | Ide | |
| 2011/0188075 A1 | 8/2011 | Narushima | |
| 2011/0299123 A1* | 12/2011 | Utsumi | G03G 15/5087 |
| | | | 358/1.15 |
| 2012/0257247 A1 | 10/2012 | Yamasaki | |
| 2013/0061080 A1 | 3/2013 | Shimizu | |
| 2013/0201510 A1* | 8/2013 | Miyata | G06F 3/1278 |
| | | | 358/1.13 |
| 2014/0118779 A1 | 5/2014 | Ito | |
| 2014/0293350 A1* | 10/2014 | Chiba | G06K 15/005 |
| | | | 358/1.15 |
| 2015/0199154 A1* | 7/2015 | Hirano | G06F 13/382 |
| | | | 358/1.14 |
| 2015/0213346 A1 | 7/2015 | Yamasaki | |
| 2015/0339560 A1* | 11/2015 | Mikami | G06F 21/45 |
| | | | 358/1.14 |
| 2015/0373222 A1* | 12/2015 | Wang | H04N 1/00891 |
| | | | 358/1.13 |
| 2016/0196483 A1 | 7/2016 | Kobayashi et al. | |
| 2016/0352947 A1* | 12/2016 | Chiba | G06K 15/4055 |
| 2016/0373488 A1* | 12/2016 | Vajravel | H04L 65/1066 |
| 2017/0153775 A1* | 6/2017 | Chiba | G06F 3/0482 |
| 2017/0339305 A1* | 11/2017 | Kawajiri | H04N 1/00344 |

* cited by examiner

| SLEEP MODE |
|---|
| LEVEL HIGH (DEEP SLEEP) |
| LEVEL MEDIUM (PRINTER SLEEP) |
| LEVEL LOW (PANEL SLEEP) |
| OFF |

FIG. 3

| SLEEP SHIFT AT TIME OF USE OF USB |
|---|
| DO NOT PERMIT |
| PERMIT |

FIG. 4

| SLEEP SETTING AT TIME OF USE OF USB DEVICE |
|---|
| SHIFT TO SLEEP STATE EVEN AT TIME OF USE |
| DO NOT SHIFT TO SLEEP STATE AT TIME OF USE |

FIG. 5

| AUTO SLEEP SHIFT TIME |
|---|
| 1 min |
| 5 min |
| 30 min |
| 60 min |

IMAGE FORMING APPARATUS, CONTROL METHOD THEREFOR, AND STORAGE MEDIUM

This is a continuation of U.S. patent application Ser. No. 15/151,515, filed May 11, 2016.

BACKGROUND OF THE INVENTION

Field of the Invention

The present invention relates to an image forming apparatus, a control method therefor, and a storage medium.

Description of the Related Art

As a technique of reducing the power consumption of an information processing apparatus such as an image forming apparatus, there is known a technique of shifting the apparatus to a low power consumption state (power saving state) such as a sleep state when the apparatus has not been used for a predetermined time. When, for example, the user performs a predetermined operation, the information processing apparatus in the sleep state returns from the sleep state to enter a usable state. Such information processing apparatus is generally configured so that the user can designate a condition for shifting to the sleep state to some extent.

In recent years, because of user's rising awareness of energy saving (power saving), stipulation of various energy saving standards, and the like, there has been an increase demand to shift the information processing apparatus to the power saving state more often. However, if the information processing apparatus is often shifted to the power saving state, a user operation for shifting the apparatus from the power saving state to the usable state may be often required, thereby impairing the user convenience. Especially for an apparatus shared by a plurality of users, such as an image forming apparatus, since users who require power saving and users who require convenience may exist together, it is necessary to provide a condition for shifting to the power saving state, which is suitable for a larger number of users.

With respect to the information processing apparatus, when an external device such as a USB (Universal Serial Bus) device is connected, the type of the external device can be taken into consideration as a condition for shifting to the sleep state. An information processing apparatus disclosed in Japanese Patent Laid-Open No. 2009-302831 acquires a class set in a connected USB device, and automatically controls, based on the acquired class, whether or not to shift an image forming apparatus to the power saving state.

Recent image forming apparatuses are known to be compatible with USB over Network (to be referred to as "USBNW" hereinafter, as needed) technology of performing communication between an external information processing apparatus communicable via a network and a USB device connected to an image forming apparatus. Using the USBNW technology makes it possible to control the USB device via the image forming apparatus by a control application installed in the external information processing apparatus.

In the conventional technique disclosed in Japanese Patent Laid-Open No. 2009-302831, however, if the USB device is connected to the image forming apparatus, a power state to which the image forming apparatus shifts is uniformly determined in accordance with the class of the USB device. Therefore, depending on the class of the USB device, the image forming apparatus does not shift to the power saving state as long as the USB device is connected to the image forming apparatus. This may lead to a situation in which it is impossible to achieve power saving of the image forming apparatus connected to the USB device. To the contrary, depending on the class of the USB device, even though the USB device is connected, the image forming apparatus may shift to the power saving state at the time of connection of the USB device and the USB device may often become unusable. In this case, the USB device cannot be sufficiently used using USBNW communication. This impairs the convenience of the user who often uses USBNW communication.

SUMMARY OF THE INVENTION

The present invention has been made in consideration of the above problem, and provides a technique of appropriately shifting an image forming apparatus to the power saving state in consideration of the use status of an external device such as a connected USB device.

According to one aspect of the present invention, there is provided an image forming apparatus comprising: a connection unit to which a USB device is connected; a control unit configured to control communication between the USB device connected to the connection unit and an external apparatus for controlling an operation of the USB device; a shift unit configured to shift the image forming apparatus from a first power state in which power is supplied to the connection unit to a second power state in which power supply to the connection unit is stopped; and an acceptance unit configured to accept a user setting indicating whether or not to shift the image forming apparatus to the second power state at the time of use of the USB device, wherein if the user setting is set to shift the image forming apparatus to the second power state at the time of use of the USB device, the shift unit shifts the image forming apparatus from the first power state to the second power state at the time of use of the USB device, and if the user setting is set not to shift the image forming apparatus to the second power state at the time of use of the USB device, the shift unit does not shift the image forming apparatus from the first power state to the second power state at the time of use of the USB device.

According to another aspect of the present invention, there is provided an image forming apparatus comprising: a connection unit to which a USB device is connected; a control unit configured to control communication between the USB device connected to the connection unit and an external apparatus for controlling an operation of the USB device; and a shift unit configured to shift the image forming apparatus from a first power state in which power is supplied to the connection unit to a second power state in which power supply to the connection unit is stopped, wherein if the USB device is not in use, the shift unit shifts the image forming apparatus from the first power state to the second power state, and if the USB device is in use, the shift unit does not shift the image forming apparatus from the first power state to the second power state.

According to still another aspect of the present invention, there is provided a control method for an image forming apparatus including a connection unit to which a USB device is connected, comprising: controlling communication between the USB device connected to the connection unit and an external apparatus for controlling an operation of the USB device; shifting the image forming apparatus from a first power state in which power is supplied to the connection unit to a second power state in which power supply to the connection unit is stopped; and accepting a user setting indicating whether or not to shift the image forming apparatus to the second power state at the time of use of the USB device, wherein in the shifting, if the user setting is set to shift the image forming apparatus to the second power state at the time of use of the USB device, the image forming apparatus is shifted from the first power state to the second power state at the time of use of the USB device, and if the user setting is set not to shift the image forming apparatus to the second power state at the time of use of the USB device, the image forming apparatus is not shifted from the first power state to the second power state at the time of use of the USB device.

According to yet another aspect of the present invention, there is provided a non-transitory computer-readable storage medium storing a computer program for causing a computer to execute a control method for an image forming apparatus including a connection unit to which a USB device is connected, the control method comprising: controlling communication between the USB device connected to the connection unit and an external apparatus for controlling an operation of the USB device; shifting the image forming apparatus from a first power state in which power is supplied to the connection unit to a second power state in which power supply to the connection unit is stopped; and accepting a user setting indicating whether or not to shift the image forming apparatus to the second power state at the time of use of the USB device, wherein in the shifting, if the user setting is set to shift the image forming apparatus to the second power state at the time of use of the USB device, the image forming apparatus is shifted from the first power state to the second power state at the time of use of the USB device, and if the user setting is set not to shift the image forming apparatus to the second power state at the time of use of the USB device, the image forming apparatus is not shifted from the first power state to the second power state at the time of use of the USB device.

According to the present invention, it is possible to appropriately shift an image forming apparatus to the power saving state in consideration of the use status of an external device such as a connected USB device.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1A:
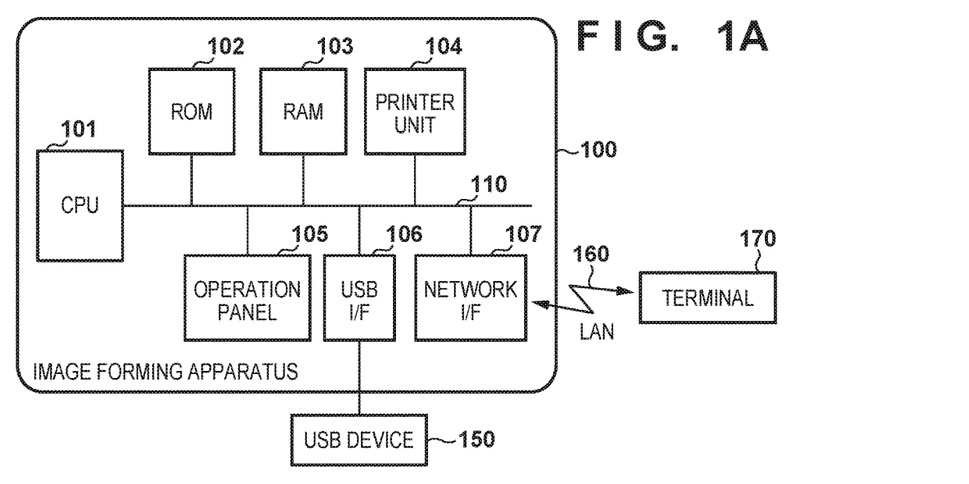
FIGS. 1A and 1B are block diagrams each showing an example of the arrangement of an image forming apparatus.

FIG. 1A is a block diagram showing an example of the arrangement of an image forming apparatus 100 according to the first embodiment. The image forming apparatus 100 includes a CPU 101, and a ROM 102, RAM 103, printer unit 104, operation panel 105, USB interface (I/F) 106, and network I/F 107 which are connected to the CPU 101 via a system bus 110. The USB I/F 106 serves as a communication interface for communication with a USB device connected to the image forming apparatus 100. The network I/F 107 serves as a communication interface for communication with an external communication apparatus via a network (LAN 160).

In this embodiment, the image forming apparatus 100, a USB device 150, and a terminal 170 all of which are shown in FIG. 1A are compatible with USBNW (USB over Network). The USBNW compatible USB device 150 is connectable to the USB I/F 106. The USB device 150 is, for example, a touch panel, card reader, USB memory, or table terminal. Furthermore, the network I/F 107 is communicable with the USBNW compatible external terminal 170 via the LAN 160. Using the USBNW technology makes it possible to control the USB device 150 from the terminal 170 using communication (USBNW communication) complying with USBNW. An application for controlling the USB device 150 is installed in the terminal 170, and is used to control the USB device 150 via the image forming apparatus 100. This allows the user to use the USB device 150 from the terminal 170 using USB communication. In this embodiment, the terminal 170 is an example of an external apparatus for controlling the operation of the USB device 150.

The CPU 101 serves as a system control unit, and controls the overall image forming apparatus 100. The ROM 102 stores a control program to be executed by the CPU 101. The ROM 102 according to this embodiment is a rewritable flash ROM, and stores data indicating setting values registered by the user of the image forming apparatus 100, and various data such as management data which can be changed, as needed. The RAM 103 is used as a work area for executing the program by the CPU 101, and also used as a temporary storage area for temporarily storing various data.

The printer unit 104 forms an image on a recording medium (recording paper) based on print data (image data) received from the external apparatus via the LAN 160. Furthermore, for example, if a tablet terminal is connected to the USB I/F 106 as the USB device 150, it is possible to form an image on a recording medium (recording paper) based on print data received from the tablet terminal. The operation panel 105 is formed by a keyboard, touch panel, LCD, LED, and the like, and accepts various operations from the user, display an operation screen, and sends a notification to the user.

As described above, when the USB device 150 is connected, the USB I/F 106 functions as an interface with the USB device 150, and controls communication with the USB device 150. The USB I/F 106 supplies power to the USB device 150. As described above, the network I/F 107 functions as an interface with the external apparatus communicable via the LAN 160, and transmits/receives data to/from the external apparatus via the LAN 160. The network I/F 107 receives, for example, print data and control information of the image forming apparatus 100 from the terminal 170. Note that the LAN 160 may be a wired LAN for wired communication or a wireless LAN for wireless communication.

Figure 1B:
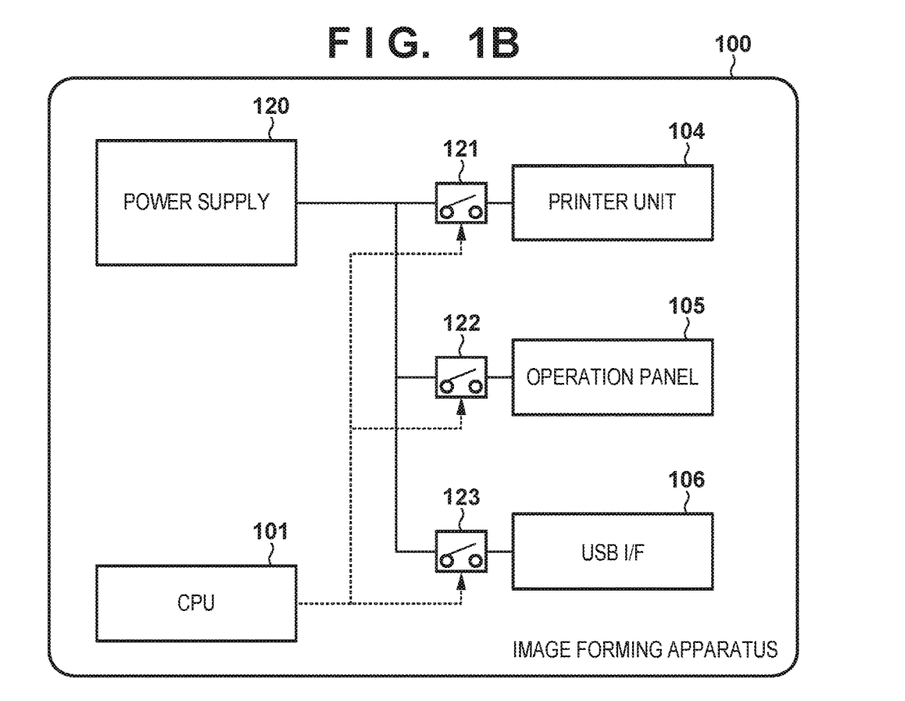

FIG. 1B shows an example of the arrangement associated with power supply from a power supply 120 in the image forming apparatus 100. As shown in FIG. 1B, the power supply 120 supplies power to the printer unit 104, operation panel 105, and USB I/F 106 via switches 121, 122, and 123, respectively. The CPU 101 controls ON/OFF switching of each of the switches 121 to 123. If each of the switches 121 to 123 is in an ON state, power is supplied from the power supply 120 to the corresponding unit. If each of the switches 121 to 123 is in an OFF state, power supply from the power supply 120 to the corresponding unit is stopped.

The CPU 101 controls ON/OFF switching of each of the switches 121 to 123 in accordance with the state of the image forming apparatus 100. In this embodiment, the image forming apparatus 100 has a normal power state (usable state) and a power saving state (sleep state) in which the power consumption is lower than that in the normal power state. When shifting the image forming apparatus 100 from the normal power state to the sleep state, the CPU 101 stops power supply to the printer unit 104, operation panel 105, and USB I/F 106 by switching the switches 121 to 123 from the ON state to the OFF state. This achieves power saving of the image forming apparatus 100 in the sleep state.

The image forming apparatus 100 in the normal power state shifts to the sleep state when a condition for shifting to the sleep state is satisfied (for example, a predetermined sleep shift time elapses). In this embodiment, the user can set whether or not to shift the image forming apparatus 100 to the sleep state. If the user selects "level high (deep sleep)" as a sleep mode in a screen shown in FIG. 2, the image forming apparatus 100 is set to shift to the sleep state. If the user selects "OFF" as the sleep mode in the screen shown in FIG. 2, the image forming apparatus 100 is set not to shift to the sleep state. The setting of the sleep mode is held in the ROM 102.

In addition, in this embodiment, the user can set whether or not to shift the image forming apparatus 100 to the sleep state while the USB device 150 is used. If the user selects "permit" as a sleep shift at the time of use of USB in a screen shown in FIG. 3, the image forming apparatus 100 shifts to the sleep state even at the time of use of USB. If the user selects "do not permit" as a sleep shift at the time of use of USB in the screen shown in FIG. 3, the image forming apparatus 100 does not shift to the sleep state at the time of use of USB. Note that if the user selects "do not permit" as the sleep shift at the time of use of USB, when the USB device 150 is connected but is not used, the image forming apparatus 100 shifts to the sleep state. The setting of the sleep shift at the time of use of USB is held in the ROM 102. As described above, the CPU 101 performs acceptance processing of accepting, using the screen shown in FIG. 3, the user setting indicating whether or not to shift the image forming apparatus 100 to the sleep state at the time of use of the USB device 150.

Based on the setting of the sleep mode, the setting of the sleep shift at the time of use of USB, and the use status of the USB device 150, the CPU 101 determines whether or not to shift the image forming apparatus 100 to the sleep state.

More specifically, if the setting of the sleep mode is "OFF", the image forming apparatus 100 does not shift to the sleep state. If the setting of the sleep mode is "level high (deep sleep)", the CPU 101 determines, based on the setting of the sleep shift at the time of use of USB, whether or not to shift the image forming apparatus 100 to the sleep state. That is, if the setting of the sleep mode is "level high (deep sleep)" and the setting of the sleep shift at the time of use of USB is "permit", when a predetermined condition is satisfied, the CPU 101 shifts the image forming apparatus 100 to the sleep state regardless of whether or not the USB device 150 is in use. On the other hand, if the setting of the sleep mode is "level high (deep sleep)" and the setting of the sleep shift at the time of use of USB is "do not permit", when the USB device 150 is in use, the CPU 101 does not shift the image forming apparatus 100 to the sleep state. Furthermore, if the setting of the sleep mode is "level high (deep sleep)" and the setting of the sleep shift at the time of use of USB is "do not permit", when the USB device 150 is not in use, the CPU 101 shifts the image forming apparatus 100 to the sleep state.

As described above, the image forming apparatus 100 according to this embodiment can shift itself to the sleep state at the time of use of the USB device 150 in accordance with the user setting (the setting of the sleep shift at the time of use of USB: permit). That is, it is possible to avoid a situation in which the image forming apparatus 100 does not shift to the sleep state at the time of use of the USB device 150 against the intention of the user who desires power saving.

The image forming apparatus 100 according to this embodiment can prevent itself from shifting to the sleep state at the time of use of the USB device 150 against the intention of the user who desires to prioritize the use of the USB device 150 in accordance with the user setting (the setting of sleep shift at the time of use of USB: do not permit).

A setting of shifting the image forming apparatus 100 to the sleep state will be described with reference to FIGS. 2, 3, 4, and 5. The setting screens shown in FIGS. 2 to 5 are displayed on the LCD of the operation panel 105 by a user operation using the operation panel 105.

Figure 2:
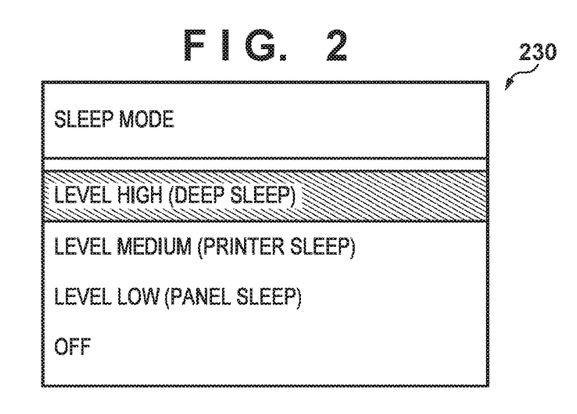
FIG. 2 illustrates a screen for setting the sleep mode of the image forming apparatus.

A sleep mode setting screen 230 shown in FIG. 2 is a screen for setting a state to which the image forming apparatus 100 shifts when the predetermined condition is satisfied. The user can select one of "level high (deep sleep), "level medium (printer sleep)", "level low (panel sleep)", and "OFF" in the setting screen 230. If the user selects "level high (deep sleep)" in the setting screen 230, the image forming apparatus 100 shifts to the sleep state in which power supply to the printer unit 104, operation panel 105, and USB I/F 106 is stopped.

Figure 3:
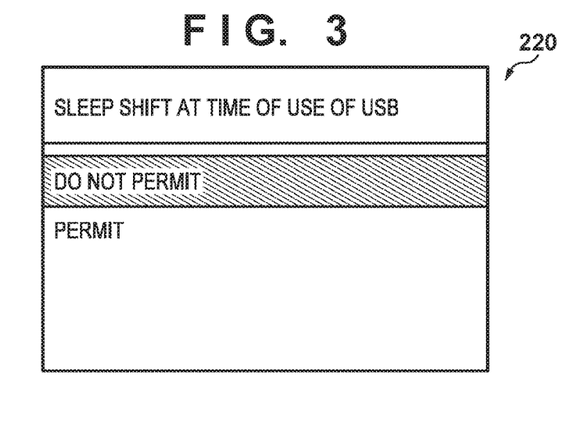
FIG. 3 illustrates a screen for setting a sleep shift at the time of use of a USB device.

A setting screen 220, shown in FIG. 3, for setting the sleep shift at the time of use of the USB device 150 is a screen for selecting whether or not to permit a shift to the sleep state at the time of use of the USB device 150. If the user selects "do not permit" in the setting screen 220, the image forming apparatus 100 does not shift to the sleep state while the USB device 150 connected to the image forming apparatus 100 is used. If the user selects "permit" in the setting screen 220, the image forming apparatus 100 shifts to the sleep state even while the USB device 150 connected to the image forming apparatus 100 is used.

Figure 4:
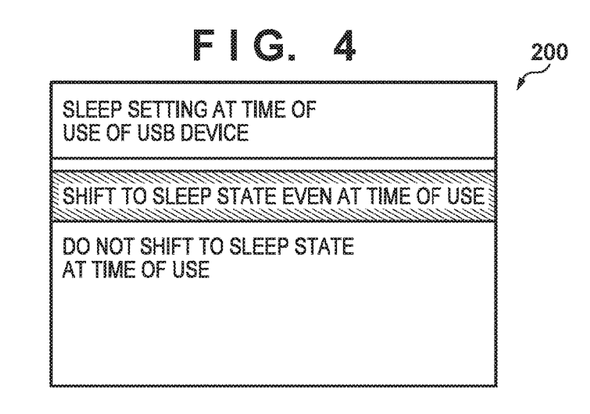
FIG. 4 illustrates a modification of the screen for setting the sleep shift at the time of use of the USB device.

A setting screen 200 shown in FIG. 4 is a modification of the setting screen 220 shown in FIG. 3. "do not permit" in the setting screen 220 corresponds to "do not shift to sleep state at time of use" in the setting screen 200 shown in FIG. 4. Furthermore, "permit" in the setting screen 220 corresponds to "shift to sleep state even at time of use" in the setting screen 200 shown in FIG. 4.

Figure 5:
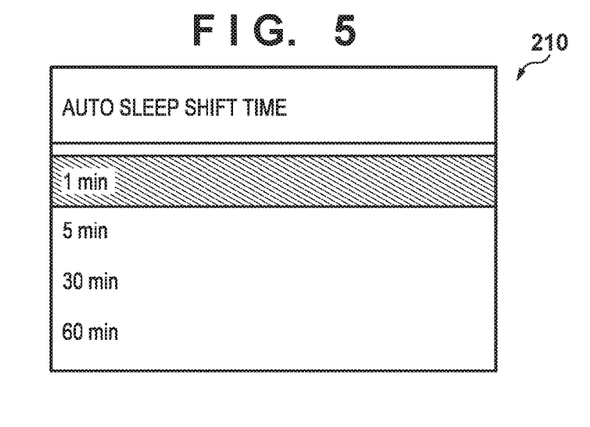
FIG. 5 illustrates a screen for setting a time until the apparatus is shifted to a sleep state.

FIG. 5 shows a screen for setting a time until the apparatus is shifted to the sleep state. The user can set a time until the image forming apparatus 100 is shifted to the sleep state in a setting screen 210 shown in FIG. 5. The user can select, for example, 1 min, 5 min, 30 min, or 60 min as a setting of the time in the setting screen 210. In the example shown in FIG. 5, 1 min is selected. The CPU 101 stores, in the ROM 102, information indicating the time selected in the setting screen 210. Note that such time (for example, 5 min) may be permanently preset without requiring setting using the setting screen 210.

Figure 6:
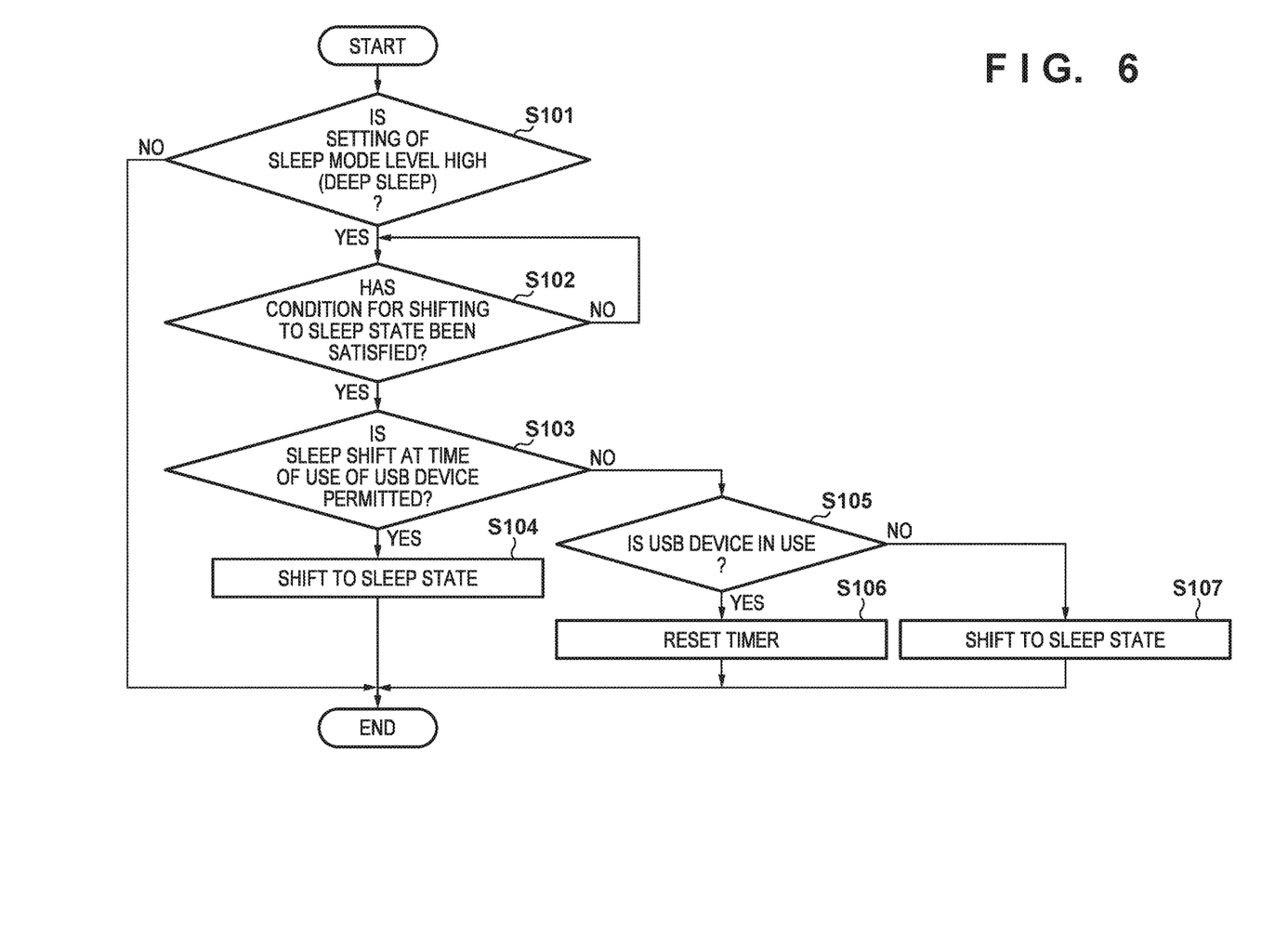
FIG. 6 is a flowchart illustrating control of the power state of the image forming apparatus at the time of use of the USB device.

FIG. 6 is a flowchart illustrating control of the power state of the image forming apparatus 100. Processing in each step shown in FIG. 6 is implemented in the image forming apparatus 100 when the CPU 101 reads out the control program stored in the ROM 102 and executes it. Note that, for example, if the USB device 150 is a card reader, USBNW communication is performed between the card reader and the terminal 170 when the user performs card authentication using the card reader.

In step S101, the CPU 101 determines whether or not the setting of the sleep mode is "level high (deep sleep)". If the setting of the sleep mode is not "level high (deep sleep)", the image forming apparatus 100 does not shift to the sleep state, and thus the processing of this flowchart ends. If it is determined that the setting of the sleep mode is "level high (deep sleep)" (YES in step S101), the CPU 101 advances the process to step S102.

In step S102, the CPU 101 determines whether or not the shift condition for shifting the image forming apparatus 100 to the sleep state has been satisfied. For example, if a time measured by a timer for determining a shift timing reaches a sleep shift time preset by the user, the CPU 101 determines that the shift condition is satisfied. Note that, for example, if the user operates the operation panel 105, the timer is reset to 0. If it is determined in step S102 that the shift condition has been satisfied, the CPU 101 advances the process to step S103.

In step S103, the CPU 101 determines whether or not the setting of the sleep shift at the time of use of the USB device is "permit". If it is determined that the setting of the sleep shift at the time of use of the USB device is "permit", the CPU 101 advances the process to step S104. In step S104, the CPU 101 shifts the image forming apparatus 100 to the sleep state. On the other hand, if it is determined that the setting of the sleep shift at the time of use of the USB device is "do not permit", the CPU 101 advances the process to step S105.

In step S105, the CPU 101 determines whether or not the USB device 150 is in use. When starting USBNW communication, a connection request is transmitted from the terminal 170 serving as a host to the USB device 150. The USB device 150 transmits a response to the connection request transmitted from the terminal 170. This establishes a communication session between the terminal 170 and the USB device 150. When ending the USBNW communication, a disconnection request is transmitted from the terminal 170 to the USB device 150. The USB device 150 transmits a response to the disconnection request transmitted from the terminal 170. This disconnects the communication session between the terminal 170 and the USB device 150. The CPU 101 determines that the USB device 150 is in use during a period from when the connection request transmitted from the terminal 170 is received until the disconnection request is received. If it is determined that the USB device 150 is in use, the CPU 101 clears (resets) the timer in step S106; otherwise, the CPU 101 shifts the image forming apparatus 100 to the sleep state in step S107.

As described above, according to this embodiment, if the setting of the sleep shift at the time of use of the USB device is "permit" when the condition for shifting to the sleep state is satisfied, even if the USB device 150 is in use, the CPU 101 shifts the image forming apparatus 100 to the sleep state. On the other hand, if the setting of the sleep shift at the time of use of the USB device is "do not permit", it is determined whether or not the connected USB device is in use. If the USB device 150 is in use, even if the USB device 150 is connected, the CPU 101 shifts the image forming apparatus 100 to the sleep state. This makes it possible to shift the image forming apparatus 100, to which the USB device 150 is currently connected, to the sleep state in accordance with the use status of the USB device 150 while maintaining the user convenience.

Second Embodiment

The second embodiment will describe an example in which an image forming apparatus 100 is shifted to the sleep state at the time of use of a USB device without requiring a user setting using the setting screen 220 shown in FIG. 3 or the setting screen 200 shown in FIG. 4. Note that a description of a part common to the first embodiment will be omitted and the difference from the first embodiment will be mainly described.

Figure 7:
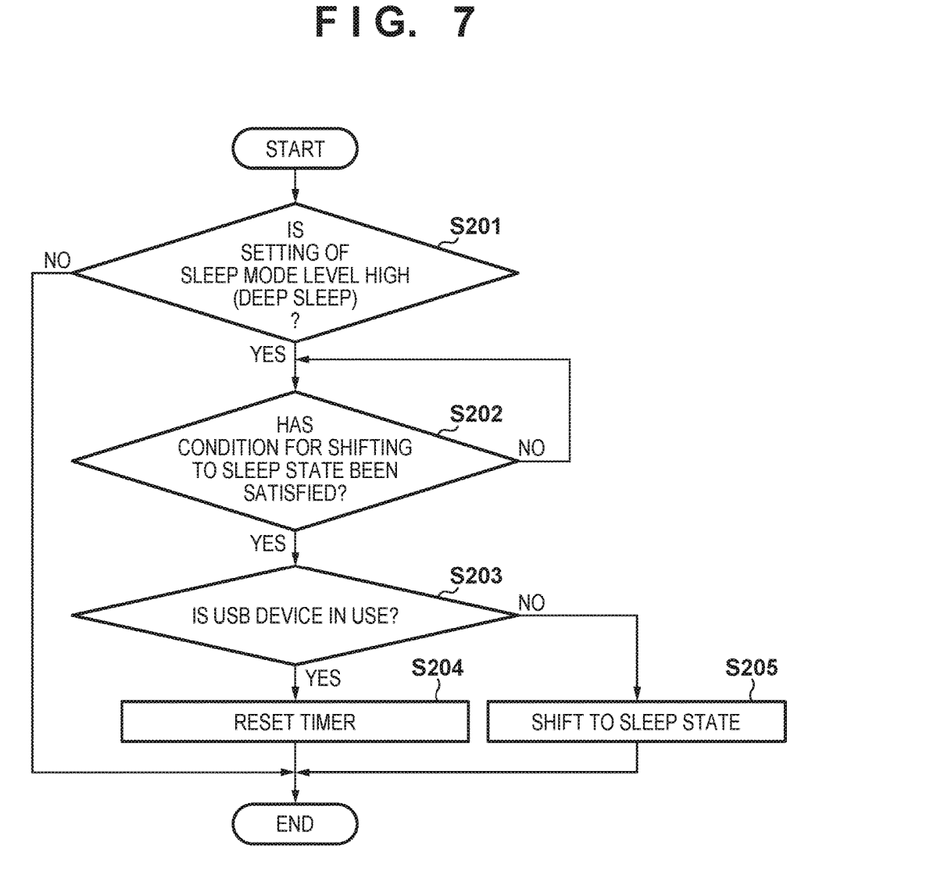
FIG. 7 is a flowchart illustrating control of the power state of an image forming apparatus at the time of use of a USB device (second embodiment).

FIG. 7 is a flowchart illustrating control of the power state of the image forming apparatus 100 according to the second embodiment. Processing in each step shown in FIG. 7 is implemented in the image forming apparatus 100 when a CPU 101 reads out a control program stored in a ROM 102 and executes it.

In step S201, similarly to step S101, the CPU 101 determines whether or not a setting of a sleep mode is "level high (deep sleep)". If the setting of the sleep mode is not "level high (deep sleep)", the CPU 101 ends the processing of this flowchart; otherwise (YES in step S101), the CPU 101 advances the process to step S202.

In step S202, similarly to step S102, the CPU 101 determines whether or not a shift condition for shifting the image forming apparatus 100 to the sleep state has been satisfied. If it is determined that a shift timing has been reached, the CPU 101 advances the process to step S203.

In step S203, similarly to step S105, the CPU 101 determines whether or not a USB device 150 is in use. If it is determined in step S203 that the USB device 150 is in use, the CPU 101 advances the process to step S204; otherwise, the CPU 101 advances the process to step S205. The CPU 101 clears (resets) a timer in step S204, and shifts the image forming apparatus 100 to the sleep state in step S205.

As described above, according to this embodiment, when the condition for shifting to the sleep state is satisfied, the CPU 101 determines whether or not the connected USB device 150 is in use. If the USB device 150 is in use, the CPU 101 does not shift the image forming apparatus 100 to the sleep state; otherwise, the CPU 101 shifts the image forming apparatus 100 to the sleep state. Thus, it is possible to shift the image forming apparatus 100, to which the USB device 150 is currently connected, to the sleep state in accordance with the use status of the USB device 150. Since the user need not set whether or not to shift the image forming apparatus 100 to the sleep state even at the time of use of the USB device, the labor of user setting can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-109122, filed May 28, 2015, and No. 2016-031463, filed Feb. 22, 2016, which are hereby incorporated by reference herein in their entirety.

What is claimed is:

1. An information processing apparatus comprising:
a USB interface;
a network interface; and
a controller that permits the information processing apparatus to shift to a power saving state, in a period during which a USB device connected to the USB interface and a network device connected via a network to the network interface are communicably connected, based on a first setting value being set, and prohibits the information processing apparatus from shifting to the power saving state in the period, based on a second setting value being set.

2. The information processing apparatus according to claim 1, wherein the period is a period during which a communication session is established between the USB device and the network device.

3. The information processing apparatus according to claim 1, wherein in the case where the first setting value is set, the controller shifts the information processing apparatus to the power saving state in accordance with a shift condition for shifting to the power saving state being satisfied.

4. The information processing apparatus according to claim 3, wherein in the case where the second setting value is set, even if the shift condition is satisfied, the controller does not shift the information processing apparatus to the power saving mode if the USB device and the network device are communicably connected.

5. The information processing apparatus according to claim 4, wherein in the case where the second setting value is set, even if a predetermined time has elapsed, the controller resets an elapsed time if the USB device and the network device are communicably connected.

6. The information processing apparatus according to claim 4, wherein in the case where the second setting value is set, the controller shifts the information processing apparatus to the power saving mode if the shift condition is satisfied and the USB device and the network device are not communicably connected.

7. The information processing apparatus according to claim 1, wherein power supply to the USB interface is stopped in the power saving state.

8. The information processing apparatus according to claim 1, wherein the controller permits or prohibits the information processing apparatus to shift to the power saving state based on preset another setting value.

9. The information processing apparatus according to claim 1, further comprising an input unit that inputs the first or second setting value.

10. The information processing apparatus according to claim 1, further comprising a display unit that displays an input screen for inputting the setting value.

11. The information processing apparatus according to claim 1, further comprising a printer.

12. The information processing apparatus according to claim 11, wherein the controller controls the printer.

13. An information processing apparatus comprising:
a USB interface;
a network interface; and
a controller that shifts, in accordance with a condition for shifting to a power saving state being satisfied, the information processing apparatus to the power saving state even in a period during which a USB device connected to the USB interface and a network device connected via a network to the network interface are communicably connected in a case where a first setting value is set, and does not shift, even if the condition is satisfied, the information processing apparatus to the power saving state in the period in a case where a second setting value is set.

14. The information processing apparatus according to claim 13, wherein the period is a period during which a communication session is established between the USB device and the network device.

15. The information processing apparatus according to claim 13, wherein in the case where the second setting value is set, even if a predetermined time has elapsed, the controller resets an elapsed time if the USB device and the network device are communicably connected.

16. The information processing apparatus according to claim 13, wherein in the case where the second setting value is set, the controller shifts the information processing apparatus to the power saving mode if the condition is satisfied and the USB device and the network device are not communicably connected.

17. The information processing apparatus according to claim 13, wherein power supply to the USB interface is stopped in the power saving state.

18. The information processing apparatus according to claim 13, wherein the controller permits or prohibits the information processing apparatus to shift to the power saving state based on preset another setting value.

19. The information processing apparatus according to claim 13, further comprising an input unit that inputs the first or second setting value.

20. The information processing apparatus according to claim 13, further comprising a display unit that displays an input screen for inputting the first or second setting value.

21. The information processing apparatus according to claim 13, further comprising a printer.

22. The information processing apparatus according to claim 21, wherein the controller controls the printer.

23. An information processing apparatus comprising:
a USB interface;
a network interface;
an input unit that inputs a user setting indicating whether or not to permit the information processing apparatus to shift to a power saving state in a period during which a USB device connected to the USB interface and a network device connected via a network to the network interface are communicably connected, and
a controller that permits the information processing apparatus to shift to the power saving state in the period, in a case where a first setting value is set for the user setting, and prohibits the information processing apparatus from shifting to the power saving state in the period, in a case where a second setting value is set for the user setting.

24. The information processing apparatus according to claim 23, wherein the period is a period during which a communication session is established between the USB device and the network device.

25. The information processing apparatus according to claim 23, wherein in the case where the first setting value is set for the user setting, the controller shifts the information processing apparatus to the power saving mode in accordance with a shift condition for shifting to the power saving state being satisfied.

26. The information processing apparatus according to claim 25, wherein in the case where the second setting value is set for the user setting, even if the shift condition is satisfied, the controller does not shift the information processing apparatus to the power saving mode if the USB device and the network device are communicably connected.

27. The information processing apparatus according to claim 26, wherein in the case where the second setting value is set for the user setting, even if a predetermined time has elapsed, the controller resets an elapsed time if the USB device and the network device are communicably connected.

28. The information processing apparatus according to claim 26, wherein in the case where the second setting value is set for the user setting, the controller shifts the information processing apparatus to the power saving mode if the shift condition is satisfied and the USB device and the network device are not communicably connected.

29. The information processing apparatus according to claim 23, wherein power supply to the USB interface is stopped in the power saving state.

30. The information processing apparatus according to claim 23, wherein the controller permits or prohibits the information processing apparatus to shift to the power saving state based on preset another user setting value.

31. The information processing apparatus according to claim 23, further comprising a display unit that displays an input screen for inputting the user setting.

32. The information processing apparatus according to claim 23, further comprising a printer.

33. The information processing apparatus according to claim 32, wherein the controller controls the printer.

* * * * *